(12) United States Patent
Krishnan et al.

(10) Patent No.: US 11,670,954 B2
(45) Date of Patent: Jun. 6, 2023

(54) HYBRID BATTERY SYSTEM

(71) Applicant: FORM ENERGY, INC., Somerville, MA (US)

(72) Inventors: Ramkumar Krishnan, Scottsdale, AZ (US); Shawn Fink, Sunnyvale, CA (US)

(73) Assignee: FORM ENERGY, INC., Somerville, MA (US)

( * ) Notice: Subject to any disclaimer, the term of this patent is extended or adjusted under 35 U.S.C. 154(b) by 277 days.

(21) Appl. No.: 16/332,431

(22) PCT Filed: Sep. 13, 2017

(86) PCT No.: PCT/IB2017/055535
§ 371 (c)(1),
(2) Date: Mar. 12, 2019

(87) PCT Pub. No.: WO2018/051248
PCT Pub. Date: Mar. 22, 2018

(65) Prior Publication Data
US 2021/0288512 A1 Sep. 16, 2021

Related U.S. Application Data

(60) Provisional application No. 62/395,112, filed on Sep. 15, 2016.

(51) Int. Cl.
*H01M 10/44* (2006.01)
*H01M 10/46* (2006.01)
(Continued)

(52) U.S. Cl.
CPC .............. *H02J 7/34* (2013.01); *H02J 7/0013* (2013.01); *H02J 7/0025* (2020.01);
(Continued)

(58) Field of Classification Search
CPC ........ H02J 7/0048; H02J 7/00712; H02J 7/34; H02J 7/0025; H02J 7/0063; H02J 9/061;
(Continued)

(56) References Cited

U.S. PATENT DOCUMENTS 5,334,463 A 8/1994 Tajima et al.
5,614,331 A 3/1997 Takeuchi et al.
(Continued)

FOREIGN PATENT DOCUMENTS

CN 101552348 A 10/2009
CN 101908662 A 12/2010
(Continued)

OTHER PUBLICATIONS

Examination Report dated Apr. 29, 2020 issued in corresponding India Application No. 201917013690 with translation (5 pgs.).
(Continued)

*Primary Examiner* — Edward Tso
(74) *Attorney, Agent, or Firm* — The Marbury Law Group PLLC (57) ABSTRACT

A stationary hybrid battery back-up system incorporates two different battery units that differ in terms of recharging efficiency, cycle life, power capability, depth of discharge threshold, temperature threshold, internal impedance threshold, charger rate efficiency and/or stand-by efficiency. The battery back-up system of the present invention comprises an auxiliary power supply that can be used to charge the first and second batteries and/or provide power to a load. When the operating voltage of the system drops, due to a power failure of a power source, the control system may couple the first and/or second battery unit to a load. The control system may have voltage threshold limits wherein it engages the first and second battery units to support the load demand. The first and second battery units may be charge by the
(Continued)

auxiliary power supply when the operating voltage is above a threshold level.

43 Claims, 6 Drawing Sheets

(51) Int. Cl.
  *H02J 7/34* (2006.01)
  *H02J 7/00* (2006.01)
  *H02J 7/35* (2006.01)
  *H02J 9/06* (2006.01)

(52) U.S. Cl.
  CPC .......... *H02J 7/0048* (2020.01); *H02J 7/0063* (2013.01); *H02J 7/0071* (2020.01); *H02J 7/00712* (2020.01); *H02J 7/35* (2013.01); *H02J 9/061* (2013.01); *H02J 2300/24* (2020.01); *H02J 2300/28* (2020.01); *H02J 2310/12* (2020.01)

(58) Field of Classification Search
  CPC ........ H02J 7/35; H02J 7/0013; H02J 2300/28; H02J 2300/24; H02J 2310/12; H02J 7/0071
  USPC ........ 320/101, 103, 110, 116, 132, 134, 136
  See application file for complete search history.

(56) References Cited

U.S. PATENT DOCUMENTS

| | | |
|---|---|---|
| 5,993,983 A | 11/1999 | Rozon |
| 6,118,248 A | 9/2000 | Gartstein et al. |
| 7,494,729 B2 | 2/2009 | Odaohhara |
| 7,528,572 B2 | 5/2009 | Masias et al. |
| 8,168,337 B2 | 5/2012 | Friesen et al. |
| 8,222,865 B2 | 7/2012 | Lim et al. |
| 8,309,259 B2 | 11/2012 | Friesen et al. |
| 8,427,098 B2 | 4/2013 | Moore et al. |
| 8,491,763 B2 | 7/2013 | Friesen |
| 8,492,052 B2 | 7/2013 | Friesen et al. |
| 2010/0285375 A1 | 11/2010 | Friesen et al. |
| 2010/0308765 A1 | 12/2010 | Moore et al. |
| 2010/0316935 A1 | 12/2010 | Friesen et al. |
| 2010/0318234 A1 | 12/2010 | Moore et al. |
| 2011/0070506 A1 | 3/2011 | Friesen et al. |
| 2011/0250512 A1 | 10/2011 | Friesen et al. |
| 2012/0025614 A1 | 2/2012 | Taimela et al. |
| 2012/0112685 A1 | 5/2012 | Hartley et al. |
| 2013/0207475 A1 | 8/2013 | Dong |
| 2014/0091631 A1 | 4/2014 | Naden et al. |
| 2015/0097518 A1 | 4/2015 | Bishop et al. |
| 2015/0270731 A1 | 9/2015 | Adelmann et al. |
| 2017/0070081 A1* | 3/2017 | Cher ....................... H02J 7/045 |

FOREIGN PATENT DOCUMENTS

| | | |
|---|---|---|
| CN | 102474123 A | 5/2012 |
| CN | 102856612 A | 1/2013 |
| CN | 103329389 A | 9/2013 |
| CN | 103887845 A | 6/2014 |
| CN | 104106175 A | 10/2014 |
| CN | 105281399 A | 1/2016 |
| CN | 105409052 A | 3/2016 |
| CN | 105846489 A | 8/2016 |
| EP | 0627134 A1 | 12/1994 |
| FR | 2879852 A1 | 6/2006 |
| WO | 00/54359 A1 | 9/2000 |
| WO | 03/088375 A2 | 10/2003 |
| WO | 2010/091583 A1 | 8/2010 |
| WO | 2010/115006 A1 | 10/2010 |
| WO | 2011/114349 A2 | 9/2011 |
| WO | 2013/164638 A2 | 11/2013 |
| WO | 2015/132631 A1 | 9/2015 |

OTHER PUBLICATIONS

International Search Report dated Nov. 30, 2017 issued in corresponding International Application No. PCT/IB2017/055535.
Written Opinion of the International Searching Authority dated Nov. 30, 2017 issued in corresponding International Application No. PCT/IB/2017/055535.
International Preliminary Report on Patentability dated Nov. 13, 2018 issued in corresponding International Patent Application No. PCT/IB2017/055535.
Office Action and Search Report for related Chinese Application No. 201780069914.5, dated Sep. 29, 2022, 7 pages.

* cited by examiner

HYBRID BATTERY SYSTEM

CROSS REFERENCE TO RELATED APPLICATIONS

This patent application is the U.S. National Phase of PCT/IB2017/055535, filed Sep. 13, 2017, which claims priority to U.S. provisional patent application No. 62/395,112, filed on Sep. 15, 2016. Both of these applications are incorporated by reference herein in their entireties.

FIELD OF THE INVENTION

The invention is directed to a hybrid battery system comprising multiple different battery units.

BACKGROUND

Battery back-up systems are configured to handle a power outage (including sags or drops where the power drops but is not entirely out) from the primary power source for a limited amount of time. The battery or batteries of the battery back-up system are discharged during a power outage and the state of charge of the back-up system is reduced. If the power outage is too long, the battery back-up system may fall below a state of charge that is sufficient to provide adequate power to the load. In many applications, a battery back-up system is employed for a relatively short amount of time, or for a time that drops the state of charge of the battery system only a fraction of a full state of charge. These applications may occasionally have an outage that is longer, however, and scaling the back-up system for characteristics of optimized performance in daily/frequent cycling conditions and optimized standby/occasional back-up power demand requirements may be too expensive. Lower efficiency battery systems may be less expensive initially, but are less efficient in terms of charge/discharge cycles and therefor have a higher operating cost. For example, lithium ion batteries are more efficient but are also more expensive compared to lead acid batteries.

SUMMARY OF THE INVENTION

One aspect of the present invention provides a hybrid battery system for power storage in a power network comprising a power source and a load. The system comprising a battery system, which comprises: a first rechargeable battery unit having a first battery chemistry; and a second rechargeable battery unit having a second battery chemistry, the first and second battery chemistries being different from each other. Such differences may provide, for example, different energy efficiencies (i.e., the ratio of energy input for charging the second battery to the energy output during discharge may be higher than for the first battery) and/or power efficiencies (i.e., the ratio of power input for charging the first battery to the power output during discharge may be higher than for the second battery) between the battery units. A controller selectively couples the battery units of the battery system to the power network (a) for delivery of electrical energy from the battery system to the load during discharging, and (b) for receipt of electrical energy from the power source for charging of the battery system during charging. A power supply voltage sensor detects an operating voltage of the power supply. The controller comprises logic for switching the controller between charging and discharging of the battery system based on the operating voltage being in a charging range or discharging range, respectively. The controller further includes charging mode selection logic for selecting between modes of charging based on the operating voltage within the charging range, the modes including (a) charging both said battery units simultaneously, (b) charging only the first battery unit, and (c) charging only the second battery unit.

The invention may be directed to a stationary hybrid battery back-up system. The two different battery units may include a first battery unit that is different from a second battery unit in terms of recharging efficiency, cycle life, power capability, depth of discharge threshold, temperature threshold, internal impedance threshold, charger rate efficiency and/or stand-by efficiency. The battery back-up system of the present invention may comprise a control system that couples a first and/or second battery unit to a load and/or charger as a function of the battery properties and inputs to the control system. A control system may be programmed or embedded with logic to switch from a first to a second battery to maximize overall system efficiency.

In an exemplary embodiment, the invention is directed to a stationary hybrid battery back-up system comprising two different battery units, a first battery unit having a high charge/recharge efficiency and a second battery unit having a lower charge/discharge efficiency than the first battery unit. In an exemplary embodiment, the first battery unit comprises non-metal-air batteries and a second battery unit comprises metal-air batteries. A stationary hybrid battery back-up system is configured to be located in a fixed position and coupled to a load, such as a residence, business or industrial building or operation and the like. The non-metal air battery unit may have a higher charge/discharge efficiency than the metal-air battery unit and may be coupled with the load at the onset of a power outage from a primary power source, such as a power grid or power generator. The power drawn from the hybrid battery back-up system may be initially only from the first battery unit and, in the event that the power outage is short, only the first battery unit may be employed for providing the back-up power. Since the first battery unit may comprises higher efficiency batteries than the second battery unit, short duration outages can be covered efficiently by the hybrid battery back-up system, wherein the charge/discharge efficiency of the first battery unit is high, and higher than the charge/discharge efficiency of the second battery unit. The secondary battery unit may be discharged in the event of a lower duration outage or when a high power demand is required. A controller system may be programmed for a particular combination of first and second battery unit types to maximize efficiency for an expected frequency and duration of outages.

A first battery unit may have an efficiency that is higher than the second battery unit such as, at least about 10% higher, at least about 50% higher, at least about 100% higher and any range between and including the values provided.

In an exemplary embodiment, a control system of the hybrid battery back-up system may switch from a first to a second battery unit as a function of the power requirements and the power capability of the two battery units. The hybrid battery back-up system may be coupled to a load that has a variable power demand requirement and depending on the power level required, the control system may couple the first and/or second battery unit in an effort to maximize overall system efficiency. For example, a first battery unit may have a lower maximum power capability than a second battery unit and in cases where the power demand from the load exceeds a threshold power demand level, the second battery may be coupled to the load, either alone or in parallel with the first battery unit. Again, the control system may be programed based on the types of battery units employed, with an effort to maximize overall efficiency and longevity of the system.

In an exemplary embodiment, the hybrid battery back-up system comprises a first battery unit having a high power capability and a second battery unit having a lower power capability. A first battery unit may have a power capability that is greater than the second battery unit, such as at least about 10% greater, at least about 20% greater, at least about 50% greater, at least about two times greater, at least about three times greater, at least about four times greater, at least about 10 times greater and any range between and including the values provided. In an exemplary embodiment, a first battery unit comprises lithium ion batteries having a power capability that about two times or more greater than the power capability of a lead acid battery. Power capability, as used herein, is the maximum power output of a battery or battery unit and may change a function of the state of charge.

In an exemplary embodiment, a control system of the hybrid battery back-up system may switch from a first to a second battery unit as a function of cycle life of the battery units. For example, a first battery unit may have a higher cycle life than a second battery unit and a control system may employ the first battery unit for a majority of the back-up power requirements to increase the longevity of the battery back-up system. The second battery unit may be employed only when there are very long duration outages and the first battery unit drops below a threshold state of charge, or when there is a high power demand. In this way, the overall system life can be extended as the second battery unit, having a lower cycle life, is not employed for battery back-up power as often as the first battery unit.

In an exemplary embodiment, the hybrid battery back-up system comprises a first battery unit having a higher cycle life than a second battery unit, such as at least about 10% greater, at least about 20% greater, at least about 50% greater, at least about 100% greater at least about 200% greater, at least about 300% greater, at least about 400% greater, at least about 500% greater and any range between and including the values provided.

In an exemplary embodiment, a control system of the hybrid battery back-up system may switch from a first to a second battery unit as a function of the depth of discharge. For example, a first battery unit may have high cycle life even when the battery is cycled at high depth of discharge, higher than a second battery unit. Alternatively, a first battery unit may have higher efficiency when the battery is cycled at a shallow depth of discharge from 100% charged state. The second battery unit may have a lower charging efficiency than the first battery unit or a lower charging efficiency below a depth of discharge level, or when the state of charge is below a threshold value. The second battery may also have a lower cycle life at high depth of discharge. In an effort to maximize overall system efficiency and/or life, the control system may employ the first battery unit and second battery unit to avoid discharging the second battery unit below or above some threshold value. For example, the first battery unit may be employed initially when there is a power outage and the second battery unit may be employed as required when there is a high power demand or when the first battery unit drops below a threshold state of charge. If the power outages are frequent, first battery cycles at high state of charge, increasing the system efficiency and/or life. Cycle life of lithium batteries at high state of charge is lower due to damage to solid electrolyte interface. Cycle life of metal-air batteries are not affected negatively at high state of charge. A hybrid system with lithium and metal-air batteries can be optimized for high cycle life using a controller by operating the state of charge of both batteries in the optimal range. Alternatively, a small portion of the energy from the first battery may also be preserved to prevent the second battery from cycling at high depth of discharge. The discharging sequence may include discharging the first battery to 90% depth of discharge, followed by discharging the second battery to 100% depth of discharge, discharging the remaining 10% of the energy from the first battery. If short duration power outages frequently occur at this stage, first battery cycles at low state of charge preserving the life of second battery which may have low cycle life at low state of charge. Lead acid batteries have very low cycle life when cycled at low state of charge. Cycle life of metal-air batteries are not affected negatively at low state of charge. A hybrid system with lead acid and metal-air batteries can be optimized for high cycle life using a controller by operating the state of both batteries in the optimal range.

In an exemplary embodiment, the hybrid battery back-up system comprises a first battery unit having a higher cycle life than a second battery unit, such as at least about 10% greater, at least about 20% greater, at least about 50% greater, at least about 100% greater, at least about 200% greater, at least about 300% greater, at least about 400% greater, at least about 500% greater and any range between and including the values provided at states of charge between 75% and 100% or 0-25% and any range between.

In an exemplary embodiment, a control system of the hybrid battery back-up system may switch from a first to a second battery unit as a function of charge rate efficiency or charge rate. For example, the control system may employ the first and/or second battery unit to provide back-up power as a function of the charge rate efficiency or charge rate of the battery units. Some battery back-up systems may require frequent back-up power and one of the battery units may have a quicker charge rate, or charge more efficiently at high rates than a second battery unit. In some instances, high power may available to charge for a limited time or power may be available at low cost for a limited time. Examples include renewable power source such as solar panels and low electricity costs after midnight in some regions. To this end, the control system may employ the first battery unit initially unless some other criteria requires the second battery unit to be employed. In another example, a battery back-up system may be required very infrequently and/or for longer outages, whereby a second battery unit having a more efficient slow charge rate may be employed more often.

In an exemplary embodiment, the hybrid battery back-up system comprises a first battery unit having a higher charge rate than a second battery unit, such as at least about 10% greater, at least about 20% greater, at least about 50% greater, at least about 100% greater and any range between and including the values provided. In addition, the efficiency of charging of a first battery unit at a first rate may be higher than an efficiency of charging a second battery unit at this same rate by at least about 10% greater, at least about 20% greater, at least about 50% greater, at least about 100% greater at least about 200% greater, at least about 500% greater, at least about 1000% greater, at least about 2000% greater and any range between and including the values provided.

In an exemplary embodiment, a control system of the hybrid battery back-up system may switch from a first to a second battery unit as a function of stand-by efficiency. For example, a first battery unit may have a higher stand-by efficiency than a second battery unit and therefore the control system may employ the first battery unit in a stand-by mode more often than the second battery unit in an effort to maximize efficiency of the overall system. Alkaline metal air batteries have a lower self discharge rate and higher efficiency than Nickel Iron batteries in idle conditions but have a lower efficiency in operation. A hybrid system with the two batteries can provide optimal efficiency to support frequent short duration cycling and infrequent/standby backup needs. In an exemplary embodiment, the hybrid battery back-up system comprises a first battery unit having a higher stand-by efficiency than a second battery unit, such as at least about 10% greater, at least about 20% greater, at least about 50% greater, at least about 100% greater, at least about 200% greater, at least about 300% greater, at least about 500% greater and any range between and including the values provided.

In the event that the power outage is longer, wherein the first battery unit drops below a threshold state of charge, the second battery unit may be coupled to the load. The threshold state of charge of the first battery unit may be about 75%, about 65%, about 50%, about 40% and any value between the threshold values provide. The second battery unit may be coupled to the load when the first battery unit drops below the threshold state of charge and the first battery unit may be disconnected from the load, thereby conserving power within the first battery unit. The first battery unit may be recoupled to the load when the state of charge of the second battery unit drops below a threshold value. Coupling both batteries to the load when the second battery unit drops below a threshold value may enable the second battery unit to be more fully discharged as the combination of battery units can support the load as the second battery unit drops below a state of charge that could support the load alone. In addition, the first battery may be recoupled to the load when a power demand level from the load exceeds the peak power capability of the second battery unit. This increased power demand level above the maximum power capability may be temporary and the first battery unit may be decoupled from the load when the increased power demand subsides. Likewise, a control system may switch from a first to a second battery unit when the internal impedance of the first battery unit exceeds a threshold internal impedance value.

An exemplary battery back-up system may comprise a dc-dc converter and/or an AC-DC converter to enable the first and second battery units to be coupled in series or parallel and coupled to a load as required for battery back-up power or for charging.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENT(S)

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
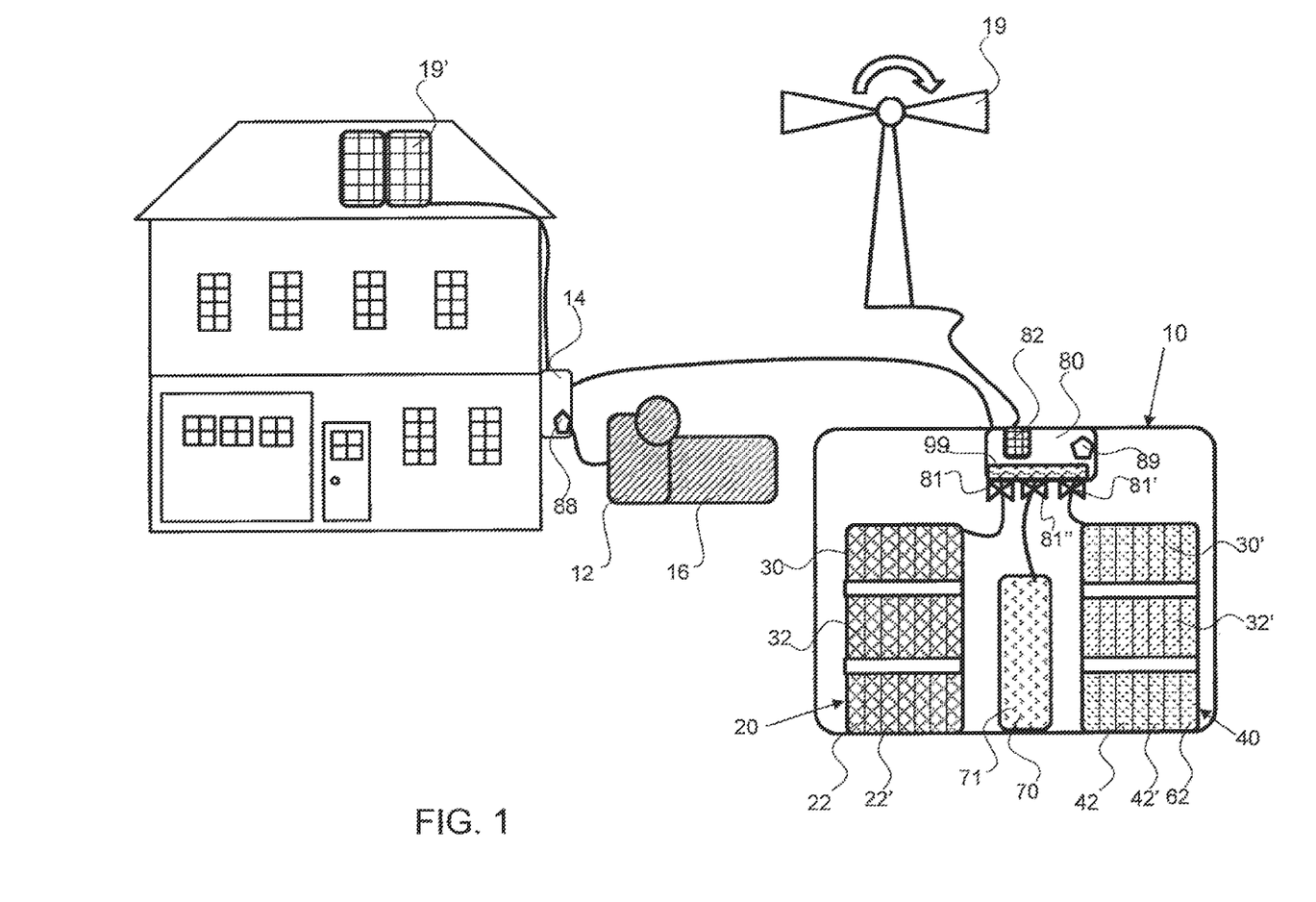
FIG. 1 shows an exemplary hybrid battery back-up system connected with a load and to a renewable energy source.

As shown in FIG. 1, an exemplary hybrid battery back-up system 10 is connected with a load 14 and to a power source. The power source may be an auxiliary power supply 19, such as a renewable power supply (e.g., a wind turbine 19 or solar panel(s) 19' or a diesel generator 16 with a power management system 12. The power source may also be a wide area AC grid, such as is conventionally powered by power plants or large scale renewable energy resources. The power source may be a local grid also, such as one that powers a smaller village or area isolated from wide area power grids, which may also use renewable or other types of power generation.

The exemplary hybrid battery back-up system comprises a first battery unit 20 having a plurality of first rechargeable (a/k/a secondary) batteries 22 and a second battery unit 40 comprising a plurality of rechargeable (a/k/a secondary) second batteries 40. The first and second battery units comprise a plurality of individual batteries configured in a battery node 30, and a plurality of nodes configured into a module 32. The individual batteries, nodes and/or modules may be connected in series or in parallel depending on the application. In addition, the first and second battery units may be connected in parallel or series as required by the application. In this embodiment, a supplemental power source 70, such as a super capacitor 71, is also configured with the hybrid battery back-up system as an option.

The battery or batteries in each unit have a different battery chemistry to provide different energy and/or power efficiencies between the battery units. The chemistry of the battery(ies) in the first battery unit may be referred to as a first battery chemistry, and the chemistry of the battery(ies) in the second battery unit may referred to as a second battery chemistry. The battery chemistry includes the fuel, oxidant, and electrolyte for ion conduction within the battery.

As shown, a control system or controller 80 comprises a processor 82 containing logic for performing the functions described herein. The logic may be embedded as software instructions, data or look-up tables, data profiles, circuitry, or a combination of both, and the processor may be a general purpose computing device or an application specific integrated circuit (ASIC). In general, the control system 80 is designed for selectively coupling the battery units to the power network including the load and one or more power sources for (a) delivery of electrical energy from the battery system to the load during discharging, and (b) receipt of electrical energy from a power source for charging of the battery system during charging.

The control system receives inputs related to the status of the load, such as from a load sensor 88 that detects a break in power supply from the primary power source 12. The control system also receives an input from a voltage sensor 89 that directly or indirectly detects an operating voltage of the power being delivered to the load from the one or more power sources. The voltage sensor can be any sensor that can indirectly or directly detect voltage, and may detect another characteristic to indirectly detect the voltage itself. The voltage sensor may be included in the battery system directly, or located distally from the battery system in more direct connection with the power source(s) and load. In some embodiments, the voltage from one or more power sources may be stepped down for application to the battery system (i.e., a 220V power signal may be stepped down to a lower voltage useable for battery charging), and the voltage sensor may detect the stepped down voltage as the operating voltage to provide an indirect detection of the voltage actually being delivered to the load by the one or more power sources.

The controller couples, decouples and recouples the first and second battery units 20, 40 and supplemental power source 70 to the load through switches 81, 81' and 81" respectively. A power converter 99 may be configured to convert power output from one or more of the battery units to enable the battery units to be coupled in series or parallel depending on the power requirement of the system. Likewise, a power converters, dc-dc or ac-dc for example, may be used to provide charging power to the battery units. The one or more power supply devices may be connected to a coupling 15, such as a busbar, and power to the load may be provided through the busbar and maintained within an operational voltage operation range.

When the control system detects an outage or drop below a threshold in the power provided to the load from the one or more power sources, the control system couples the first battery unit 20 with the load 14 by switch 81, wherein electrical power from the first battery unit is provided to the load. As described herein, in an embodiment only the first battery unit may be electrically coupled with the load unless the state of charge of the first battery unit drops below a threshold value, or a power demand level from the load exceeds the maximum power capability of the first battery unit; in which case, the second battery unit or a capacitor may be electrically coupled to the load. The first battery unit may contain batteries that are a higher efficiency than the batteries of the second battery unit. Short power outages that require only the first battery unit to be coupled to the load, therefore are more efficiently covered by the hybrid battery-back up system.

As shown in FIG. 1, the first battery unit may contain only one type of battery, such as a lithium ion battery and the second battery unit may contain only metal-air batteries. A first or second battery unit may comprise dissimilar individual batteries, however. For example, the second battery unit 40 comprises a third battery 62, such as a hybrid metal-air battery, that is of a different type than the second batteries 42, 42'.

In an embodiment, the first battery unit may comprise rechargeable non-metal air batteries including, but not limited to lithium ion, iron phosphate, lithium oxide, lithium ion polymer, nickel metal hydride, nickel cadmium, nickel zinc, silver zinc, lead-acid, nickel-iron and the like. In an exemplary embodiment, the first battery unit is made up of only one type of battery, such as lithium ion batteries that typically has a charge/discharge efficiency of about 80-90%. The individual batteries of the first battery unit may be coupled together in series or in parallel as required by the application.

The second battery unit may comprise a rechargeable metal-air battery including, but not limited to, zinc-air, iron air, and hybrid metal air batteries, as described for example in U.S. Patent Application Publication No. 20110250512 (Ser. No. 13/083,929), to Fluidic Inc., the entirety of which is incorporated by reference herein. As described in this incorporated '512 publication, the hybrid metal-air cell may comprise a fuel electrode, an oxygen evolving electrode and an air electrode. As also described in this incorporated '512 publication, a metal air battery cell comprises a plurality of electrodes comprising (i) a fuel electrode comprising a metal fuel and (ii) an air electrode for exposure to an oxygen source. An electrode of the plurality other than the fuel electrode (i.e. the air electrode or an additional electrode) comprises a reversible metal capable of reversible oxidation to a reducible species thereof and reduction to an oxidizable species thereof. Also, an electrode of the plurality other than the fuel electrode has an oxygen evolving functionality. For purposes of clarity, the number of electrodes could be two or more. The metal-air battery cell also comprises an ionically conductive medium for conducting ions among the plurality of electrodes.

The metal-air battery, as described herein, may have any construction or configuration, and the examples described herein are not intended to be limiting. For example, the cell may be constructed in accordance with any one of the following patent applications, the entirety of each of which is incorporated herein by reference: U.S. Pat. Nos. 8,168,337, 8,309,259, 8,491,763, and 8,492,052, U.S. Publication Nos. 20100316935, 20100285375, and 20110070506, and U.S. Application Ser. Nos. 61/177,072, 61/243,970, 61/249,917, 61/301,377, 61/304,928, 61/329,278, 61/334,047, 61/365,645, 61/378,021, 61/394,954, 61/358,339 and 61/267,240.

The charge/discharge efficiency of a zinc-air battery is typically about 50-60% whereas the hybrid metal-air battery can have an efficiency of about 60% to 95%. Since the metal-air battery of the hybrid battery back-up system has a lower efficiency, it is employed for providing battery back-up power only after the first battery unit drops below a threshold state of charge, therein improving system efficiency for short duration power outages. The first battery unit may have a charge/discharge efficiency that is about 10% or more, about 20% or more, about 30% or more or about 90% or more than that of the second battery unit. In an exemplary embodiment, the second battery unit consist only of a single type of metal-air battery, such as zinc-air batteries. The second battery unit may comprise a combination of metal-air battery types, such as zinc-air and hybrid metal-air batteries. The individual batteries of the second battery unit may be coupled together in series or in parallel as required by the application.

As is mentioned in the above-incorporated patent applications, the fuel electrode 12 of a metal-air battery may comprise a single body on which the fuel is reduced/electrodeposited, or it may comprise a series of spaced apart bodies on which the fuel is reduced/electrodeposited progressively or in parallel simultaneously, as discussed in some of the above-incorporated patent applications. Neither approach is intended to be limiting.

Using the zinc example, the oxidation half-cell reaction at the fuel electrode 12 during discharge in an alkaline electrolyte may be expressed as:

$$Zn + 4OH^- \rightarrow Zn(OH)_4^{2-} + 2e^- \quad (1)$$

In solution, the zincate ion may further react to form zinc oxide as follows:

$$Zn(OH)_4^{2-} \rightarrow ZnO + H_2O + 2OH^- \quad (2)$$

As can be appreciated, the oxidation of zinc to zinc oxide (or zinc to zincate if it remains dissolved in the solution) is reversible, and thus these reactions may occur in reverse during re-charge to electrodeposit the zinc on the fuel electrode.

The control system 80 may also monitor the state of charge of the first and or second battery through any conventional means including through monitoring the power drawn from the battery. The control system 80 may measure the current of a battery power supply to a load and use this to calculate a state of charge. In another embodiment, the controller 80 measures an impedance value of the battery to determine a state of charge.

As shown in FIG. 1, a plurality of auxiliary power sources, 19, 19' are optionally coupled with the hybrid battery back-up system. The wind power system 19 is coupled directly to the hybrid battery back-up system and the solar power system 19 is coupled to the load with a cable connecting it also to the hybrid battery back-up system. A renewable power supply derives power from a renewable source such as the sun or wind and includes wind power generating systems, and solar power systems comprising a photovoltaic cell, as shown in FIG. 1. The renewable power supply may comprise a inverter or charge controller that enables the power generated by the renewable power supply to be coupled to the battery units for delivery to a load or for charging the battery unit(s).

Figure 2:
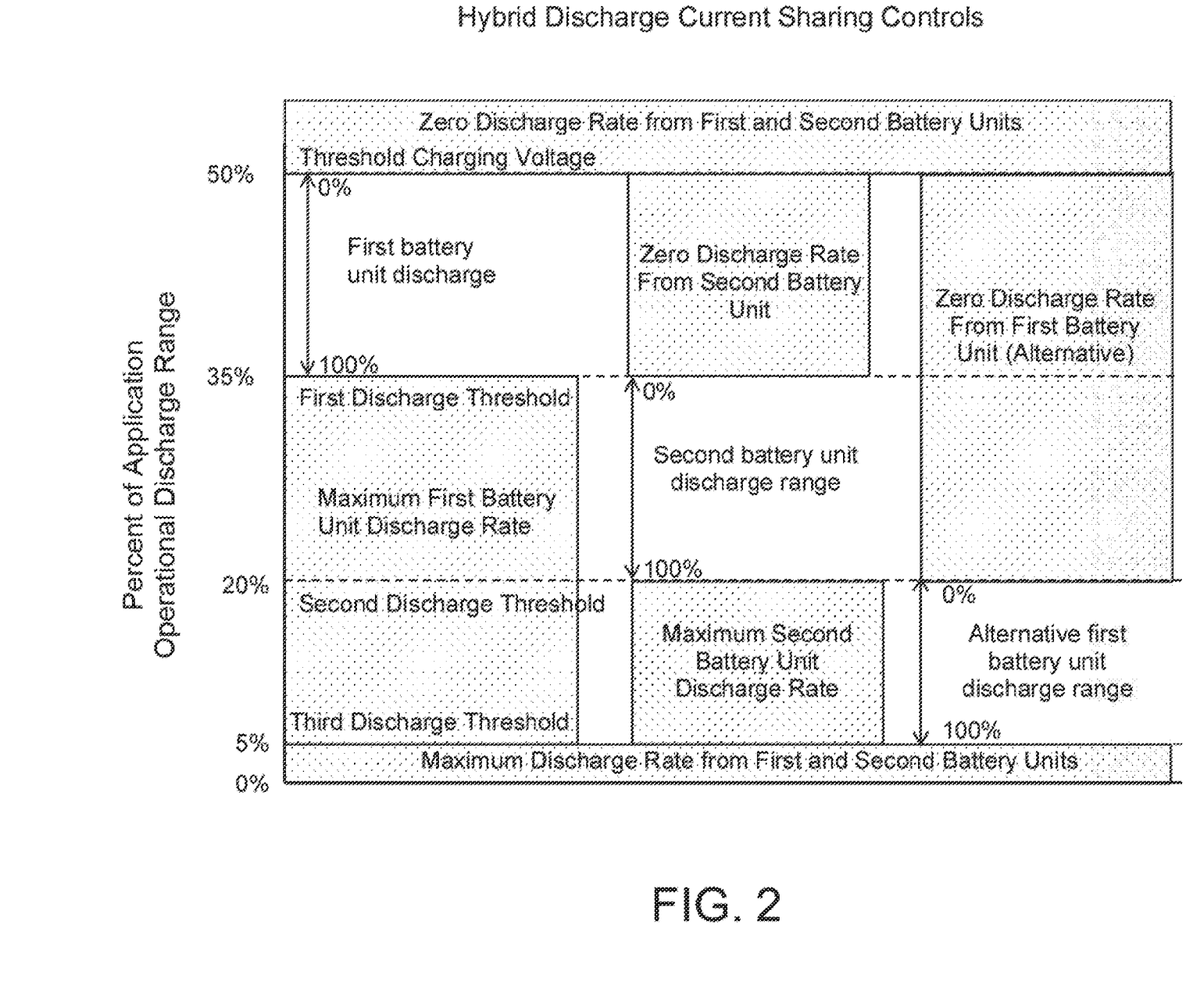
FIG. 2 shows a graph of an exemplary hybrid battery back-up system discharge current sharing control.
Figure 3:
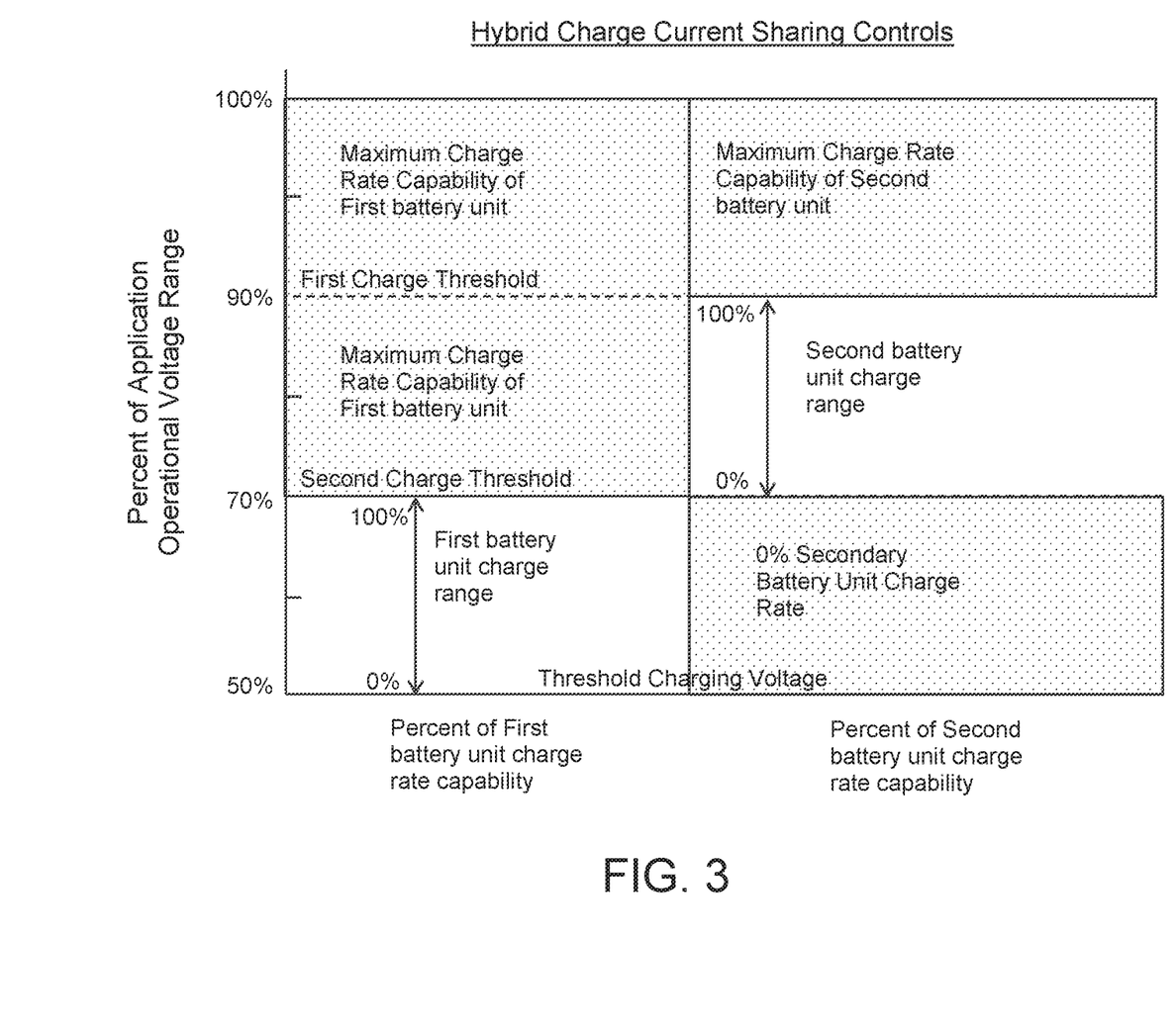
FIG. 3 shows a graph of an exemplary hybrid battery back-up system charge current sharing control.

Referring now to FIGS. 2 and 3, an exemplary battery back-up electrical power system controls the rate of charging and discharging of a first and second battery unit to enable an efficient use of power and to provide effective back-up power to a load. The controller may adjust the discharge rate of first and second battery using the output voltage from each battery unit and a power converter. In an exemplary embodiment, the power delivered to the load from the one or more power sources has a target operational voltage range for the application and this operational voltage range may be expresses in terms of percentage of this range, or 0% to 100%. For example, an application operational voltage range of 10V from 46-56V may be the range targeted for the load, with 0% of the range being 46V and 100% of the range being 56V.

The control system's 80 logic is configured for switching the control system 80 and its associated components between charging and discharging of the battery based on the operating voltage being in a charging range or a discharging range, respectively. An exemplary battery back-up electrical power system may have a set threshold voltage or voltages that determine whether and how the battery system and the battery units thereof will be charged or discharged. A threshold voltage may be express as a percentage of the operating operational voltage range.

For example, there may be one set voltage threshold at 50% of the operational range (51V in the 46-56V example), as shown in FIGS. 2 and 3 and labelled "threshold charging voltage". The range above that set voltage threshold would be considered the charging range, because the power supplied to the load is relatively robust and more power is available for use in battery charging (assuming the batteries are not already charged). In contrast, the range below that set voltage would be considered the discharging range, because the power supplied to the load is weaker and it may be beneficial to discharge additional power from the battery system (assuming the batteries have not reached a discharge limit).

In other embodiments, there may be more than one set voltage threshold. For example, it is possible that the discharge range could be below 49V, and the charge range could be above 53V. That would mean that no discharging or charging of the battery system occurs between 49-53V, as that may be understood to be a range where there is sufficient voltage for the load, but not enough to warrant directing additional power away for battery recharging. Thus, the invention is not limited to one set voltage threshold for defining what are regarded as charge and discharge ranges. The example of FIGS. 2 and 3 and the logic reflected therein has a single set threshold voltage, and the embodiment will be described in reference to that for convenience, understanding that the invention is not limited to a single threshold.

In this embodiment, the lower portion of the operating DC voltage range, for example, 5V, or an operating DC voltage from 46-51V, is the discharge range. Within that range, the batteries of one or both battery units 20, 40 may be discharged, and that is accomplished by further selections of discharge modes that may be used. Specifically, the logic in the control system further includes discharging mode selection logic for selecting between modes of discharged based on the detected operating voltage within the discharging range. Those modes include (a) discharging both battery units 20, 40 simultaneously, (b) discharging only the first battery unit 20, and (c) discharging only the second battery unit 40. As shown in FIG. 2, when the operating voltage is in the discharge range but above a first discharge threshold, or between 35-50% of the operational voltage range, 49.5-51V, the control system 80 will cause the first battery unit 20 to discharge up to its maximum discharge rate to meet the load demand and the second battery unit will not discharge. Optionally, the rate of discharge for the first battery unit 20 may increase in a progressive manner (such as gradually or in steps) from 0% to 100% as the operating voltage drops within that part of the range. If the operating voltage falls below 35% of the operational voltage range, or below the first discharge threshold, i.e. below 49.5V, the control system 80 will continue to discharge the first battery unit 20 at its maximum rate, but will also discharge the second battery unit 40 as well. Similarly to the initial discharging of the first battery unit, the rate of discharge for the second battery unit 40 may optionally increase in a progressive manner from 0% to 100% as the operating voltage drops within that part of the range, thus resulting in both battery units being at maximum as the operating voltage reaches a second discharge threshold.

As another option, in embodiments where a third energy storage device is included, such as another battery in one of the units or in its own unit, or a different type of storage device such as a supercapacitor, when the operational voltage drops below the second discharge threshold, set in FIG. 2 at below 20% of the operational voltage range, i.e. 47V, the first and second battery units will discharge at their respective maximum discharge rates to meet the load demand and the third energy storage device (labelled as the alternative first battery unit as an example) will be discharged. The rate of discharge for the third storage device may also optionally increase in a progressive manner from 0% to 100% as the operating voltage drops within that part of the range to a third discharge voltage (below which all the batteries are discharging at maximum capacity)

A separate threshold event, may override the discharge control diagram as shown in FIG. 2. For example, if the temperature of a cell or cells exceeds a threshold, the environmental temperature ambient to a cell falls below or above a threshold temperature, an impedance value of a cell or cells exceeds a threshold, a state of charge for a cell or cells falls below a threshold, or a time of discharge exceeds a threshold, that may override any logic. In that event, the control system may not use the approach of FIG. 2, and may opt to use the other battery unit unaffected by the threshold event to provide the discharge power. Or it may opt to use both battery units in parallel, such as may be done when a cell or sub-set of cells in one unit is affected by the threshold event and not used, thus relying on the other battery unit to supply supplemental discharge power.

As shown in FIG. 3, an exemplary battery back-up electrical power system controls the rate of charging of a first and second battery unit. Following the example provided above, an exemplary battery back-up electrical power system having an operating voltage range from 46-56V may only charge when the operating voltage is in the charging range above the set threshold voltage at 50%, or 51V. Within that range, the batteries of one or both battery units 20, 40 may be charged, and that is accomplished by further selections of charge modes that may be used. Specifically, the logic in the control system further includes charging mode selection logic for selecting between modes of charging based on the detected operating voltage within the charging range. Those modes include (a) charging both battery units 20, 40 simultaneously, (b) charging only the first battery unit 20, and (c) charging only the second battery unit 40.

As shown in FIG. 3, both the first and second battery units are charged at their respective maximum charge rates when the operating voltage is above at first charge threshold, e.g. 90% of the operating voltage range (i.e. above 50V). When the operating voltage drops below 90%, or the first charge threshold, the first battery unit may continue to charge at a maximum charge rate and the second battery unit is also charged. Optionally, the rate of charge for the second battery unit 40 may decrease in a progressive manner (such as gradually or in steps) from 100% to 0% as the operating voltage drops within that part of the range. When the operating voltage drops below 70%, or a second charge threshold, the first battery unit is charged and the second battery is not charged. Optionally, the rate of charge for the first battery unit 20 may decrease from 100% to 0% as the operating voltage drops within that part of the range. When the operating voltage drops below the threshold charging voltage, both the first and second battery units cease charging.

As was the case with discharging, a threshold event may override this logic and cause the controller to switch charging of a first battery or a second battery unit, or switch charging of a first battery unit to the second battery unit and vice versa. For example, if while charging the first battery unit become too hot, the controller may switch charging to the second battery unit until the temperature of the first battery unit drops below a threshold temperature.

The controller can adjust the discharge rate of first or second battery by hardware, software or a combination of hardware and software controls independently without any communication between other first or second batteries connected in parallel. Alternatively, the controller of first or second battery can communicate between other controllers to determine and adjust the discharge rate.

The controller can also adjust the Ampere-hour capacity rate by adjusting the discharge rate. In a system with many first and second batteries, the controller can distribute the current or power demand for discharging. The controller can use control schemes known to persons skilled in the art. For example, a proportional, differential, proportional-integral, proportional-differential or proportional-integral-differential control scheme can be used to adjust the current or power drawn from any first or second battery.

It may be desirable to perform droop compensation in the electrochemical cell system as described in U.S. Patent Application Publication No. 20140091631 (Ser. No. 14/039,285 filed on Sep. 27, 2013), entitled Droop Compensation Using Current Feedback the entirety of which is hereby incorporated by reference herein. Droop compensation may be used to facilitate equalization of currents, which may correspondingly equalize a lifecycle of the cell modules and the electrochemical cells therein. By equalization of currents, it may be understood that the droop compensation may facilitate generally or essentially equalizing the currents (e.g., driving the currents towards equalization, into a state generally regarded in the art as being equalized). In an embodiment, droop compensation may be performed utilizing a control circuit associated with a controller in each cluster control unit. As such, in some embodiments droop compensation may be performed on a cell module by cell module basis. That is, using the technique in the aforementioned application, the droop compensation will bring the currents output by the various modules towards equilibrium. In other embodiments, droop compensation may be performed among subsets of the cell modules, such as by being implemented at the level of the cell interface units. In still other embodiments, droop compensation may be performed on a cell by cell basis, being implemented associated with each individual electrochemical cells. For example, all the cells in a given battery unit, or cell module of a battery unit, may have control circuits using droop compensation to bring the currents output by the various cells towards equilibrium. Other implementations are also possible. For example, droop compensation circuits could be used at both the individual cell level and the module level.

Figure 4:
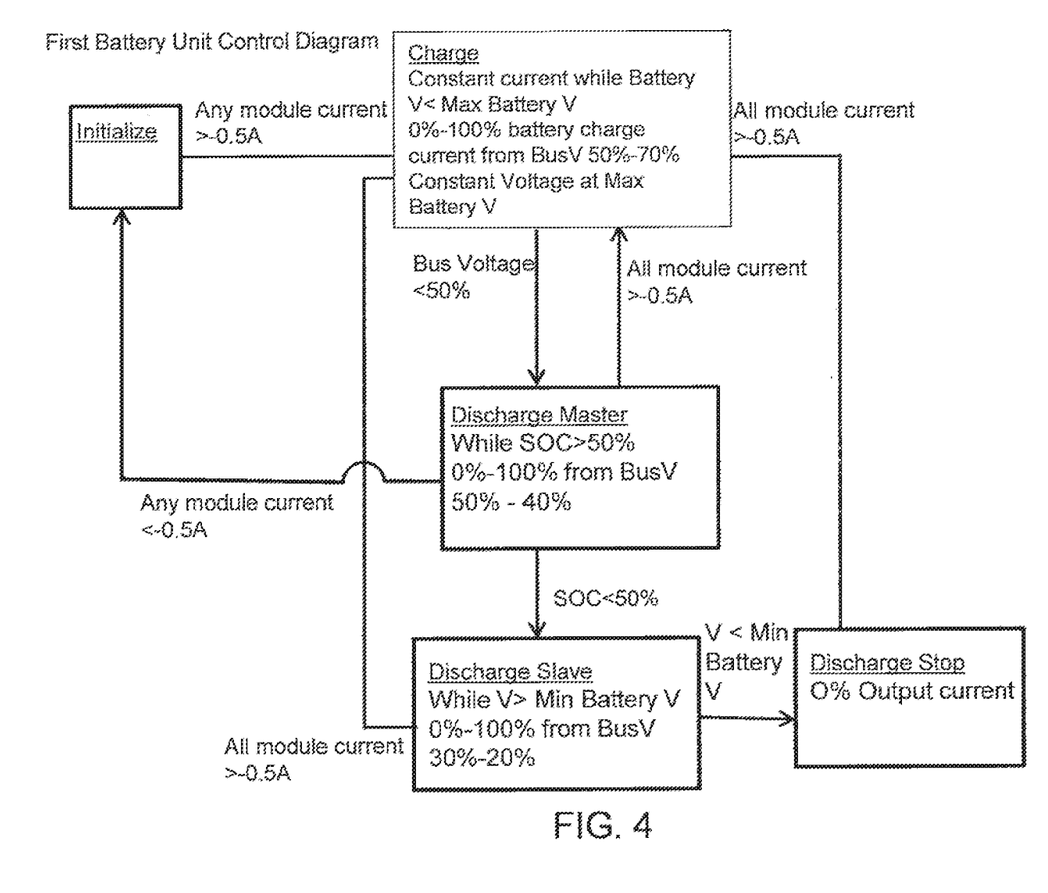
FIG. 4 shows an exemplary hybrid battery back-up system first battery unit control diagram.

FIG. 4 shows an exemplary control diagram for the first battery unit. When no load is required from the hybrid back-up battery system, the first battery unit may receive a charge in accordance with the logic discussed above. The diagram also shows that the first battery unit is discharged when there is a demand in accordance with the logic discussed above until the state of charge of the first battery unit drops below 50% of a full state of charge value. The second battery unit is then discharged. The first battery unit may be a lithium ion battery unit, containing only lithium ion batteries. This control diagram illustrates how a threshold event, such as the state of charge of the first battery unit, may cause the system to switch the battery unit being discharged.

Figure 5:
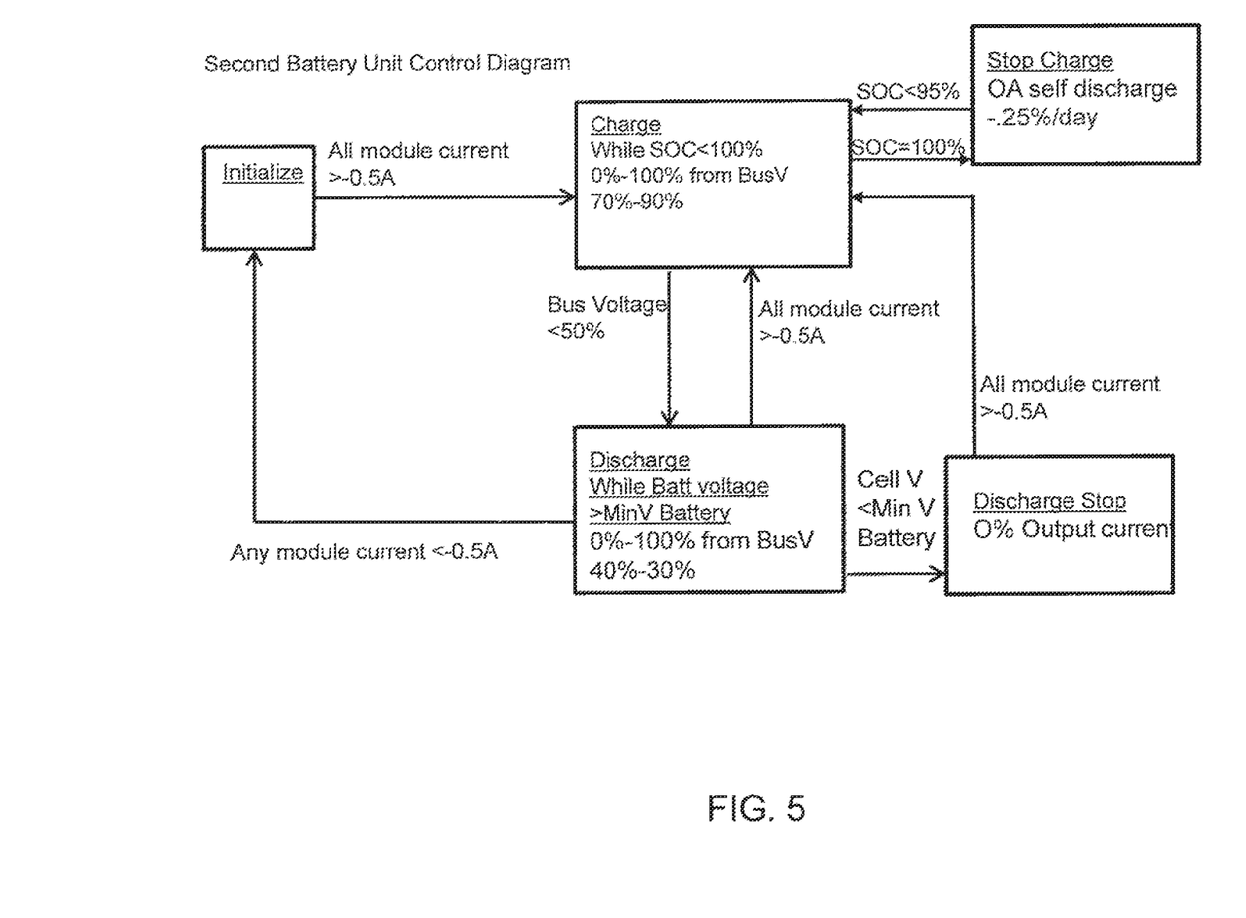
FIG. 5 shows an exemplary hybrid battery back-up system second battery unit control diagram.

FIG. 5 shows an exemplary hybrid battery back-up system second battery control diagram. When no load is required from the hybrid back-up battery system, and the first battery unit is charged above a threshold value, the second battery unit may receive a charge. The diagram shows that the second battery unit is discharged until the second battery unit individual battery voltage drops to less than 0.95V, the minimum cell voltage threshold used to limit further discharge.

Figure 6:
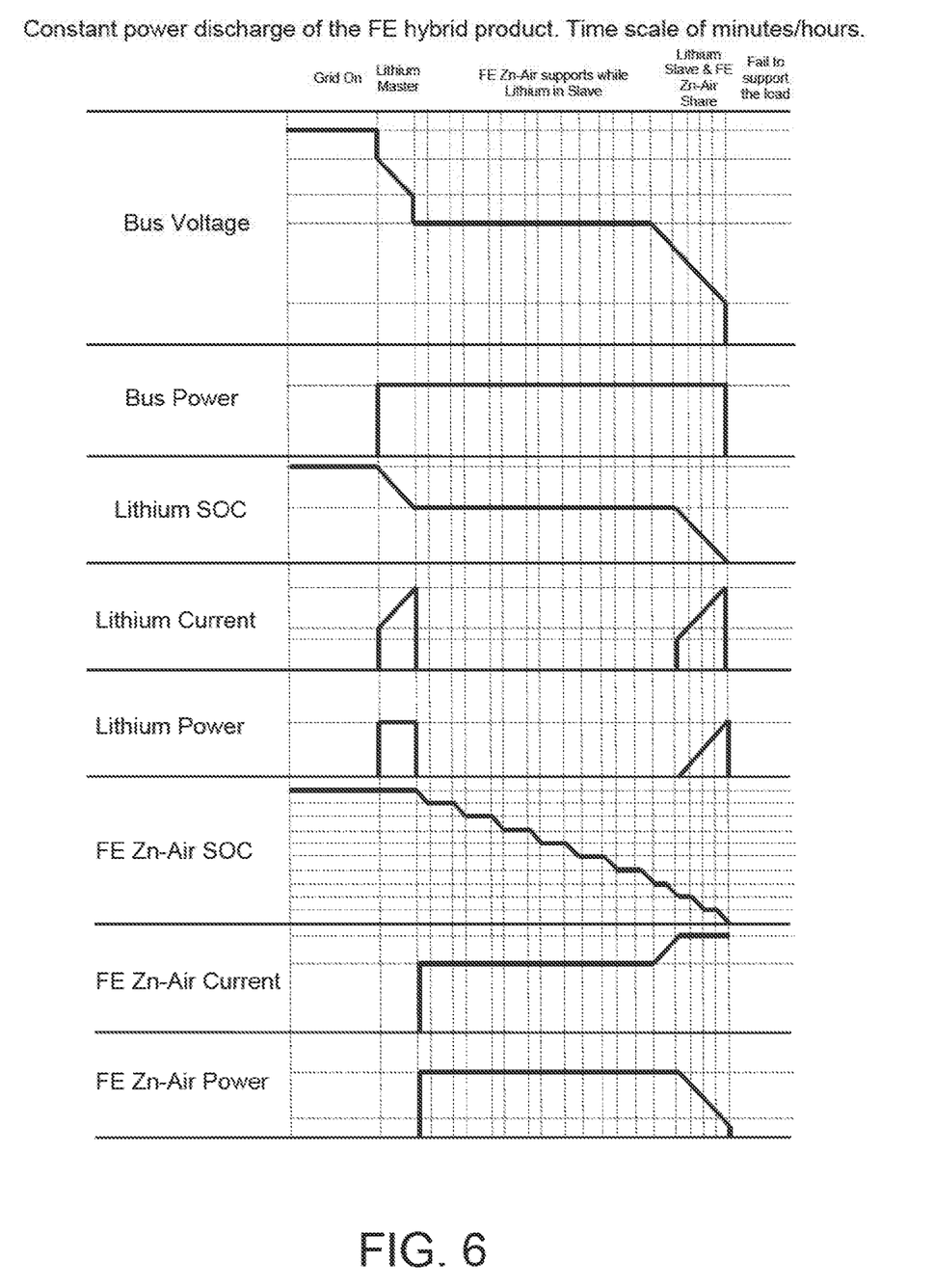
FIG. 6 shows an exemplary hybrid battery back-up system discharge power supply schedule for a power outage event.

FIG. 6 shows an exemplary hybrid battery back-up system discharge power supply schedule for a power outage event. Note that the both the lithium ion battery and the metal air battery are coupled to the load towards the end of a discharge cycle to enable a more complete discharge of the metal-air battery.

Charge/discharge efficiency, or simply efficiency, as used herein with respect to the battery or battery units, is the efficiency of a charging and discharging cycle. Not all of the energy used to charge a battery results in useable energy during discharge, there are some losses during both charging and discharging that reduce efficiency.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A hybrid battery system for power storage in a power network comprising a power source and a load, comprising:
   a battery system comprising:
   a first rechargeable battery unit having a first battery chemistry; and
   a second rechargeable battery unit having a second battery chemistry,
   the first and second battery chemistries being different from each other;
   a control system for selectively coupling the battery units of the battery system to the power network (a) for delivery of electrical energy from the battery system to the load during discharging, and (b) for receipt of electrical energy from the power source for charging of the battery system during charging;
   a power supply voltage sensor for detecting an operating voltage of the power being delivered to the load from the power source,
   the control system comprising logic for switching the control system between charging and discharging of the battery system based on the operating voltage being in a charging range or a discharging range, respectively;
   wherein the control system further includes charging mode selection logic for selecting between modes of charging based on the operating voltage within the charging range, the modes including: (a) charging both said battery units simultaneously each at a predetermined charge rate when the operating voltage is above a first threshold, (b) charging the first battery unit at the predetermined charge rate thereof and the second battery unit at a decreased rate when the operating voltage is below the first charge threshold and above a second charge threshold, and (c) charging only the first battery unit at a decreased rate when the operating voltage is below the second charge threshold.

2. The system according to claim 1, wherein the first battery unit has a higher power efficiency than the second battery unit, and the second battery unit has a higher energy efficiency than the first battery unit.

3. The system of claim 1, wherein a threshold voltage separates the charging range from the discharging range.

4. The system of claim 3, wherein the power source has an operative voltage range and the threshold charging voltage is about 50% of said operative voltage range.

5. The system of claim 1, wherein the first charge threshold is above about 90% of the operative voltage range.

6. The system of claim 1, wherein the second charge threshold is above about 70% of the operative voltage range.

7. The system according to claim 1, wherein the control system further includes discharging mode selection logic for selecting between modes of discharging based on the operating voltage within the discharging range, the modes of discharging including: (a) discharging both said battery units simultaneously each at a predetermined rate when the operating voltage is below a second discharge threshold, (b) discharging the first battery unit at a predetermined rate thereof and the second battery unit at a decreased rate when the operating voltage is above the second discharge threshold and below a first discharge threshold, and (c) discharging only the first battery unit when the operating voltage is above the first discharge threshold.

8. The system of claim 7, wherein the control system includes threshold event logic configured to switch from discharging the first battery unit to discharging the second battery unit in the event a first battery unit threshold event is detected, irrespective of the mode selected by the discharging mode selection logic.

9. The system of claim 8, wherein the control system monitors a state of charge of the first battery unit and the state of charge falling below a level is the first battery unit threshold event.

10. The system of claim 9, wherein the state of charge is determined by an impedance of the first battery unit.

11. The system of claim 8, wherein the threshold event is when the impedance value of the first battery unit exceeds about 110% of the impedance of the first battery unit at maximum state of charge.

12. The system of claim 8, wherein the threshold event is the first battery unit exceeding a threshold temperature for the first battery unit.

13. The system of claim 8, wherein the threshold event is an environmental temperature of the first battery unit exceeding a threshold environmental temperature.

14. The system of claim 8, wherein the threshold event is an environmental temperature of the first battery unit dropping below a threshold environmental temperature.

15. The system of claim 8, wherein the threshold event is a power demand exceeding a power capability threshold of the first battery unit.

16. The system of claim 15, wherein the power demand is greater than about 90% of a power capability of the first battery unit.

17. The system of claim 8, wherein the threshold event is the first battery unit dropping below a threshold voltage for a first battery unit.

18. The system of claim 8, wherein the threshold event is a depth of discharge of the first battery unit dropping below a threshold depth of discharge level.

19. The system of claim 18, wherein the control system is configured to electrically de-couple, through a first switch, the first battery unit from the load, when the first battery unit drops below the threshold depth of discharge level.

20. The system of claim 19, wherein the control system is also configured to electrically de-couple, through a second switch, the second battery unit from the load, when the second battery unit drops below a threshold depth of discharge level.

21. The system of claim 18, wherein the threshold depth of discharge level is about 10% of a full state of charge.

22. The system of claim 18, wherein the threshold depth of discharge level is about 20% of a full state of charge.

23. The system of claim 1, wherein a first battery efficiency is at least about 10% higher than a second battery efficiency.

24. The system of claim 1, wherein a first battery efficiency is at least about 20% higher than a second battery efficiency.

25. The system of claim 1, wherein the first battery unit incorporates only first batteries.

26. The system of claim 1, wherein the second battery unit incorporates only second batteries.

27. The system of claim 1, wherein the first battery unit incorporates only first batteries, and wherein the second battery unit incorporates only second batteries.

28. The system of claim 27, wherein the first battery unit consists of lithium ion batteries and the second battery unit consists of rechargeable metal-air batteries.

29. The system of claim 27, wherein the first battery unit consists of lithium ion batteries and the second battery unit consists of rechargeable zinc-air batteries.

30. The system of claim 1, wherein the first battery unit comprises a lithium ion battery and the second battery unit comprises a zinc-air battery.

31. The system of claim 1, wherein the second battery unit incorporates a third battery, wherein the third battery is a different type of battery than the second battery.

32. The system of claim 31, wherein the third battery is a hybrid metal-air battery comprising a reversible metal in one of an electrode.

33. The system of claim 1, further comprising a supplemental power source that is coupled to the load.

34. The system of claim 33, wherein the supplemental power source is a capacitor.

35. The system of claim 34, further comprising a switch that couples the capacitor to the load; and
wherein the control system couples the capacitor to the load when there is a power demand that is greater than about 90% of a maximum power capability of the first and second battery units.

36. A hybrid battery system for power storage in a power network comprising a power source and a load, comprising:
a battery system comprising:
a first rechargeable battery unit having a first battery chemistry; and
a second rechargeable battery unit having a second battery chemistry,
the first and second battery chemistries being different from each other;
a control system for selectively coupling the battery units of the battery system to the power network (a) for delivery of electrical energy from the battery system to the load during discharging, and (b) for receipt of electrical energy from the power source for charging of the battery system during charging;
a power supply voltage sensor for detecting an operating voltage of power being delivered to the load from the power source in the battery system,
the control system comprising logic for switching the control system between charging and discharging of the battery system based on the operating voltage being in a charging range or a discharging range, respectively;
wherein the control system further includes charging mode selection logic for selecting different modes of charging based on both the operating voltage of the battery system being within the charging range and threshold events affecting a condition of a battery unit, wherein the modes of charging comprise (a) charging both battery units simultaneously and (b) charging only the first battery unit.

37. The system of claim 36, wherein the control system further includes discharging mode selection logic for selecting different modes of discharging based on both the operating voltage within the discharging range and the threshold events, and wherein the modes of discharging comprise (a) discharging both battery units simultaneously and (b) discharging only one of the first battery unit and the second battery unit.

38. A method of charging and discharging a hybrid battery system for power storage in a power network comprising a power source and a load, the hybrid battery system comprising: a battery system comprising: a first rechargeable battery unit having a first battery chemistry; and a second rechargeable battery unit having a second battery chemistry, the first and second battery chemistries being different from each other; and a power supply voltage sensor for detecting an operating voltage of the power being delivered to the load from the power source; wherein the method comprises:
switching between modes of charging and modes of discharging the battery system based on the operating voltage being in a charging range or a discharging range, respectively; and
wherein the modes of charging include:
(a) charging both said battery units simultaneously each at a predetermined charge rate when the operating voltage is above a first threshold,
(b) charging the first battery unit at the predetermined charge rate thereof and the second battery unit at a decreased rate when the operating voltage is below the first charge threshold and above a second charge threshold, and
(c) charging only the first battery unit at a decreased rate when the operating voltage is below the second charge threshold.

39. The method according to claim 38, wherein the modes of discharging include:
(a) discharging both said battery units simultaneously each at a predetermined rate when the operating voltage is below a second discharge threshold,
(b) discharging the first battery unit at a predetermined rate thereof and the second battery unit at a decreased rate when the operating voltage is above the second discharge threshold and below a first discharge threshold, and
(c) discharging only the first battery unit when the operating voltage is above the first discharge threshold.

40. The method according to claim 38, wherein the modes of discharging include:
(a) discharging both battery units simultaneously, and (b) discharging only one of the first battery unit and the second battery unit.

41. A method of charging and discharging a hybrid battery system for power storage in a power network comprising a power source and a load, the hybrid battery system comprising: a battery system comprising: a first rechargeable battery unit having a first battery chemistry; and a second rechargeable battery unit having a second battery chemistry, the first and second battery chemistries being different from each other; and a power supply voltage sensor for detecting an operating voltage of the power being delivered to the load from the power source in the battery system; wherein the method comprises:

switching between charging and discharging of the battery system based on the operating voltage being in a charging range or a discharging range, respectively; and     wherein different modes of charging are selected based on both the operating voltage within the charging range and threshold events affecting a condition of a battery unit.

42. The method according to claim 41, wherein the modes of charging comprise (a) charging both battery units simultaneously and (b) charging only the first battery unit.

43. The method according to claim 41, wherein different modes of discharging are selected based on both the operating voltage within the discharging range and the threshold events, and wherein the modes of discharging comprise (a) discharging both battery units simultaneously and (b) discharging only one of the first battery unit and the second battery unit.

* * * * *